US006031877A

United States Patent [19]

Saunders

[11] Patent Number: 6,031,877

[45] Date of Patent: Feb. 29, 2000

[54] APPARATUS AND METHOD FOR ADAPTIVE BEAMFORMING IN AN ANTENNA ARRAY

[75] Inventor: Simon Saunders, Guildford, United Kingdom

[73] Assignee: Motorola, Inc., Schaumburg, Ill.

[21] Appl. No.: 08/913,747

[22] PCT Filed: Dec. 16, 1996

[86] PCT No.: PCT/EP96/05649

§ 371 Date: Feb. 5, 1998

§ 102(e) Date: Feb. 5, 1998

[87] PCT Pub. No.: WO97/27643

PCT Pub. Date: Jul. 31, 1997

[30] Foreign Application Priority Data

Jan. 27, 1996 [GB] United Kingdom .................. 9601657

[51] Int. Cl.[7] ................................ H04B 7/02; H04L 1/02

[52] U.S. Cl. ........................................ 375/267; 455/226.2

[58] Field of Search .................................... 375/267, 260, 375/259; 455/562, 226.1, 226.2, 226.3

[56] References Cited

U.S. PATENT DOCUMENTS

| | | | |
|---|---|---|---|
| 5,510,796 | 4/1996 | Applebaum | 342/162 |
| 5,548,834 | 8/1996 | Suard et al. | 455/276.1 |
| 5,646,958 | 7/1997 | Tsujimoto | 375/233 |
| 5,689,528 | 11/1997 | Tsujimoto | 375/233 |
| 5,796,779 | 8/1998 | Nussbaum et al. | 375/267 |

*Primary Examiner*—Don N. Vo
*Assistant Examiner*—Phuong Phu
*Attorney, Agent, or Firm*—Heather L. Creps

[57] ABSTRACT

An apparatus and a method for receiving and transmitting information from an array of adaptive antenna elements, wherein a predictive filter supplies an estimate of received signal samples likely to be received in a burst immediately preceding a transmission. Combination of this estimate with received signal samples obtained from actual (historically received) signals, received over a predetermined number of frames, yield estimates of optimum beamforming coefficients for application to data for transmission from an adaptive array of antenna elements. As such, available processing time for obtaining the beamforming coefficients is increased.

10 Claims, 2 Drawing Sheets

APPARATUS AND METHOD FOR ADAPTIVE BEAMFORMING IN AN ANTENNA ARRAY

BACKGROUND OF THE INVENTION

This invention relates, in general, to communication systems and is particularly applicable to communication systems using an adaptive beamforming technique.

SUMMARY OF THE PRIOR ART

The use of adaptive antennas (AA) in communication systems (particularly frequency division multiplexed (FDM) systems, such as the pan-European digital cellular Global System for Mobile (GSM) communication and alternate code-division multiple access (CDMA) systems) is becoming increasingly attractive because such adaptive antennas offer general improvements in system performance, and especially handling (traffic) capacity. As will be appreciated, a high degree of beam accuracy is achieved in an adaptive antenna system by accurately varying the phase and amplitude (magnitude) components of a transmitted wave. More specifically, phases and magnitudes of a set of transmitted waves, emanating from an array of antenna elements of a transceiver, are varied by "weighting" individual elements in the array such that an antenna radiation pattern (of a base site, for example) is adapted (optimised) to match prevailing signal and interference environments of a related coverage area, such as a cell.

Adaptive transmit beamforming in duplex communication systems requires that beamforming coefficients (i.e. the "weighting" factors) are adjusted in response to previously received channel information, which received information may occur in either an up-link or down-link for the system. In fact, when specifically considering a GSM base station, beamforming coefficients for a traffic mode must be calculated (estimated) within a period of four time-slot durations (namely a time of $4\times 15/26$ milliseconds (ms), nominally 2.3 ms), whereas the period for calculating beamforming coefficients at a mobile unit may, in fact, be of shorter duration. Unfortunately, when one considers the amount of processing required to calculate (estimate) these beamforming coefficients, this limited period of time places severe constraints on an achievable accuracy. Indeed, upon receipt of a signal, information contained within the signal (typically) must be sampled, stored and then demodulated (by synchronisation and equalisation processes). Additionally, transmit weights must be formed from the received signal and then applied to data for transmission prior to loading and modulation of this data.

Furthermore, the limited time available for processing is further eroded by the problems inherently associated with such beamforming mechanisms, which problems principally result from: (i) the beamforming coefficients (weights) being frequency dependent (bearing in mind that the up-link and down-link resources usually operate at different frequencies, such that a frequency transposition and a phase-error correction is required); and (ii) a time dependent fluctuation in channel environment caused by a relative movement between a mobile unit and a fixed base station. In the latter respect, the effects of a time variation may be mitigated to some extent by averaging several received slots weights, for example, but this form of time correction is rather coarse.

With respect to selection of beamforming coefficients in typical communication systems (and as will be understood), an optimum selection (corrected, of course, for differences between the up-link and down-link frequencies) is provided by the Wiener solution:

$$w_{opt}=R_{xx}^{-1}r_{xd} \qquad \text{(eqn. 1)}$$

where:

i) $x=[x_1, x_2, \ldots x_{(n-1)}, x_{(n-2)}]^T$ is a received signal vector at n branches (i.e. n antenna elements);

ii) $w_{opt}=[w_1, w_2, \ldots w_{(n-1)}, w_{(n-2)}]^T$ is a vector of optimum weights for the n branches;

iii) $r_{xd}=E[x^*s]$ is a correlation of a received signal vector with a desired signal vector, s, that is sent during a defined training sequence of a burst;

iv) $R_{xx}$ is the received signal cross-correlation matrix and equals $E[x^*x^T]$;

v) $R_{xx}^{-1}$ represents an inverse matrix for the matrix $R_{xx}$;

vi) $x^*$ is the complex conjugate of x;

vii) T is a vector transposition function in which rows are substituted for columns and vice versa; and viii) E[.] denotes an expectation value.

The beamforming coefficients necessarily calculated for a succeeding frame of information must be estimated from historic received signals because correlation matrices $R_{xx}$ and $r_{xd}$ are not available directly (inasmuch as one cannot know what these correlation matrices are until such time as a signal relating to these matrices has been received). In this respect, an estimation $\overline{R}_{xx}$. (denoted by the bar) suitable for use in calculating approximate weights for a succeeding frame (n+1) is given by the equation:

$$\overline{R}_{xx}(n+1)=\frac{1}{B}\sum_{k=n-B+1}^{n}x^*(k)x^T(k) \qquad \text{(eqn. 2)}$$

where B is the number of sample portions (such as bursts) that are taken into consideration per estimation (which may, in certain circumstances involve more than one burst per frame), as expressed in the article "Signal Acquisition and Tracking with Adaptive Arrays in the Digital Mobile Radio System IS-54 with Flat-Fading" by J. H. Winters, published in IEEE Transactions on Vehicular Technology in November 1993, 42(4), pages 377–384. As such, an estimation of the correlation matrices is based on actual received signals.

As such, it is desirable, generally, to provide a reliable but improved mechanism (particularly in terms of increased efficiency) by which beamforming coefficients are calculated.

SUMMARY OF THE INVENTION

Apparatus for receiving and transmitting information from an array of adaptive antenna elements, the apparatus comprising storage means for storing received information and characterised by: a predictive filter for estimating, in response to the received information, predicted information likely to be received by the apparatus in at least one future transmission to the apparatus; and means for combining the previously received information and the predicted information to generate beamforming coefficients for weighting information to be transmitted subsequently from the array of adaptive antenna elements, thereby allowing beamforming coefficients to be calculated prior to receipt of information to be received by the apparatus in at least one future transmission to the apparatus.

An a second aspect of the present invention there is provided a method of receiving and transmitting information in an apparatus having an array of adaptive antenna elements, the method comprising the step of storing received information and characterised by the steps of: estimating, in response to the received information, predicted information likely to be received by the apparatus in at least one future transmission to the apparatus; and combining the previously received information and the predicted information to generate beamforming coefficients for weighting information to be transmitted subsequently from the array of adaptive antenna elements, thereby allowing beamforming coefficients to be calculated prior to receipt of information to be received by the apparatus in at least one future transmission to the apparatus.

Exemplary embodiments of the present invention will now be described with reference to the accompanying drawings.

DETAILED DESCRIPTION OF A PREFERRED EMBODIMENT

Figure 1:
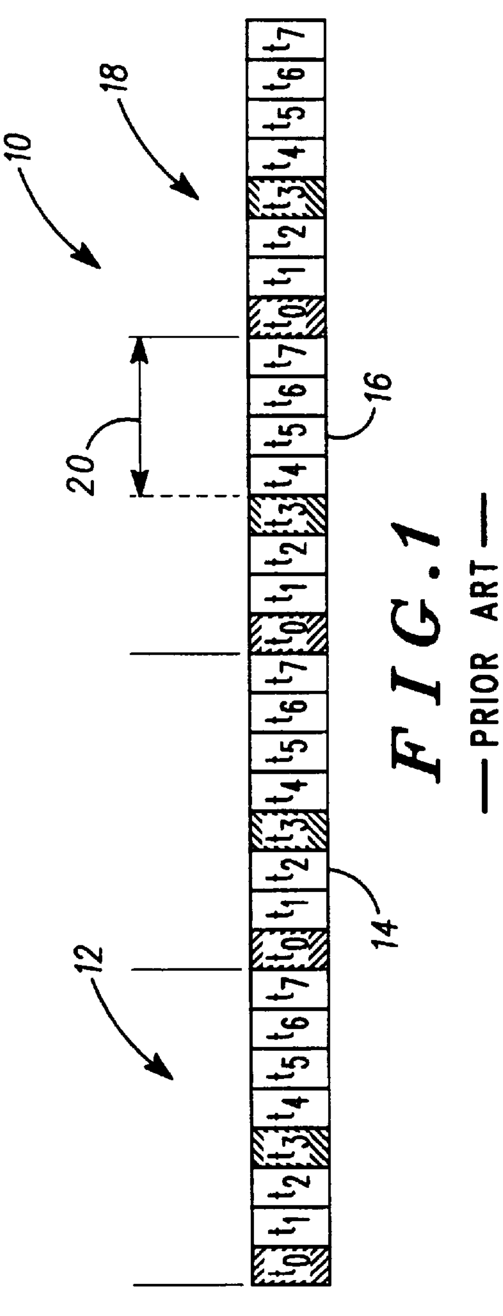
FIG. 1 PRIOR ART
FIG. 1 is a representation of a prior art duplex communication channel.

Referring to FIG. 1 there is shown a representation of a prior art duplex communication channel 10, which comprises a plurality of frames 12–18 (in this specific instance only four frames are illustrated for the sake of brevity). Each frame is divided into eight discrete time-slots $t_0$–$t_7$ (although it will be appreciated that the number of time-slots may vary according to the system and that each time slot may be of differing duration). As will be understood, the duplex communication channel 10 may be a traffic channel (TCH) or a broadcast control channel (BCCH), with a distinction between these differing forms of channel being realised by the assignment of at least one dedicated time-slot (usually $t_0$) in the BCCH for system control purposes. If we consider the duplex communication channel 10 to be a TCH, then time-slot $t_0$ would typically be assigned as a down-link, whereas time-slot $t_3$ would be assigned to a corresponding up-link. The remaining time-slots would be assigned/paired in a similar fashion. Therefore, in this example, a buffering of two time-slot occurs between down-link transmission and up-link reception in each frame 12–18, and a buffering 20 of four time-slots ($t_4$–$t_7$) occurs between up-link reception and down-link transmission in contiguous frames, as explained above. Clearly, in the case of a mobile unit, the buffering is correspondingly reversed.

According to eqn. 2, a received signal vector, x(k), of a frame k can be derived (from a cross-correlation of bits of a training sequence, such as a known mid-amble sequence in the specific case of GSM) once per burst transmission, while the number of bursts required per estimation, B, is adjusted according to an anticipated rate-of-change of $R_{xx}$. However, eqn. 2 requires the use of x(n) and is therefore subject to the limited available time between reception and transmission of information by a communication device, e.g. the base station or the mobile unit.

The preferred embodiment of the present invention utilises linear predictive filtering to supply an estimate of received signal samples, $\bar{x}(n)$, likely to be received in the burst immediately preceding a transmission, and combines this estimate with received signal samples obtained from actual (historically received) signals received over an arbitrary (predetermined) number of bursts or frames, e.g. three frames. As will be understood, linear predictive filtering may be modelled on the equation:

$$\bar{x}(n) = \sum_{m=n-M}^{n-1} a_m^T x(m) \qquad \text{(eqn. 3)}$$

where:

i) $a_m$ are the vectors of filter coefficients obtained using techniques known in those of ordinary skill in the art (see the reference book "Adaptive Filter Theory" by Simon Haykin, 2nd Edition, New Jersey, U.S.A.; Prentice-Hall, 1986. ISBN: 0-13-01326-5 for a method of optimising the choice of $a_m$);

ii) M is a length of the linear predictive filter;

iii) m is an index integer; and iv) n is the current frame.

Therefore, according to a preferred embodiment of the present invention, an estimation of the correlation matrix is provided by:

$$\bar{R}_{xx}(n+1) = \frac{1}{B}\left(\sum_{k=n-B+1}^{n-1} x^*(k)x^T(k) + \bar{x}^*(n)\bar{x}^T(n)\right) \qquad \text{(eqn. 4)}$$

Figure 2:
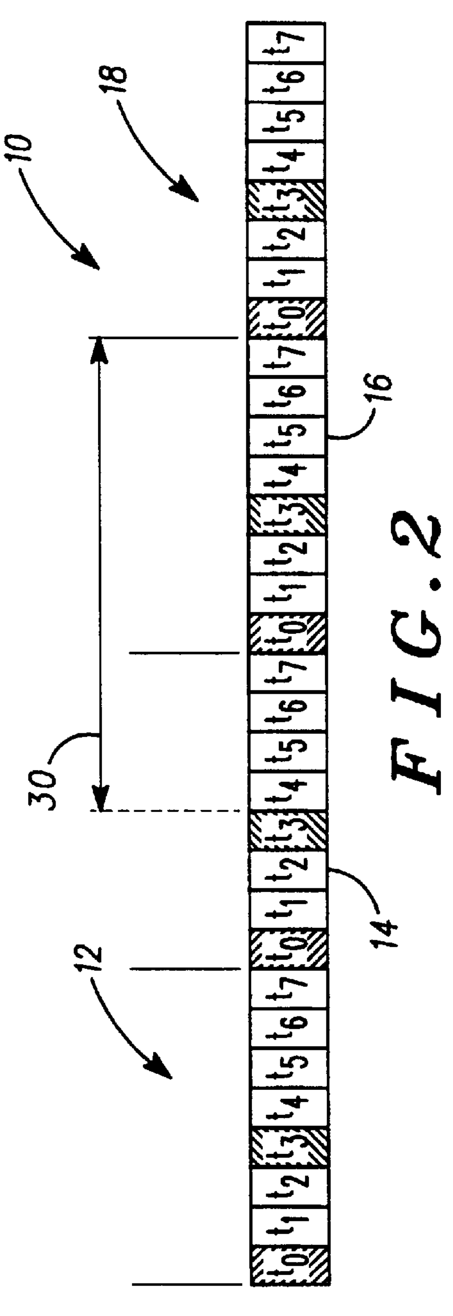
FIG. 2 illustrates a relative timing advantage obtained through the implementation of the present invention in relation to processing of the duplex communication channel of FIG. 1.

The mechanism of the present invention therefore allows beamforming coefficients to be calculated in advance of the receipt of a burst (because previously received signals influence subsequent beamforming coefficients), such as before time-slot $t_3$ in the case of the base station of FIG. 1. Consequently, additional time-slots are made available for processing between reception and transmission of data, thereby providing increased buffering 30. This increased buffering is shown in FIG. 2 in which a relative timing advantage obtained through the implementation of the present invention can be seen relative to a corresponding processing time for the duplex communication channel of FIG. 1. It will be understood that the increased buffering 30 may be an entire frame or greater, but it is at least the additional period provided between the last actual received burst and the burst estimated by the linear predictive filter (which may occur in the same frame).

Although predictive filtering in itself requires processing within a microprocessor (or the like) of a communication device, the additional time provided to the communication device allows either the use of more sophisticated decoding and beamforming algorithms (the latter of which will improve the resolution and accuracy for beamforming within the communication system, generally) or the use of a slower (and hence less expensive) processor. However, the additional processing required in the communication device may be optimised by an appropriate limitation of the number of bursts, B, used during estimation.

For the sake of brevity the mechanism for the calculation of $\bar{R}_{xx}$ has been described in detail, although it will be understood that an identical mathematical approach is preferably adopted for the estimation of $\bar{r}_{xd}$; albeit that appropriate substitutions are required, namely that $x^T$ or $\bar{x}^T$ become $s^T$.

The basic concept of the present invention may be developed further by weighting each term in eqn. 4 by a factor appropriate to an anticipated rate-of-change of $R_{xx}$, thereby making the correlation matrix estimation itself predictive.

This can be expressed mathematically as:

$$\overline{R}_{xx}(n+1)=\frac{1}{B}\left(\sum_{k=n-B+1}^{n-1}c(k-n+B)x^*(k)x^T(k)+c(B)\overline{x}^*(n)\overline{x}^T(n)\right) \quad \text{(eqn. 5)}$$

where a set of values c=[c(1), c(2), . . . c(B)]$^T$ is estimated in advance to minimise estimation error through empirical measurements of point received data over a coverage area (as measured between a mobile unit and a fixed base station). Therefore, this predictive weighting takes account of an actual rate-of-change of the correlation matrix $R_{xx}$. As such, the inclusion of the coefficients c provides a relative weighting of terms within the series of eqn. 5 to minimise an error in estimation for $R_{xx}$.

Figure 3:
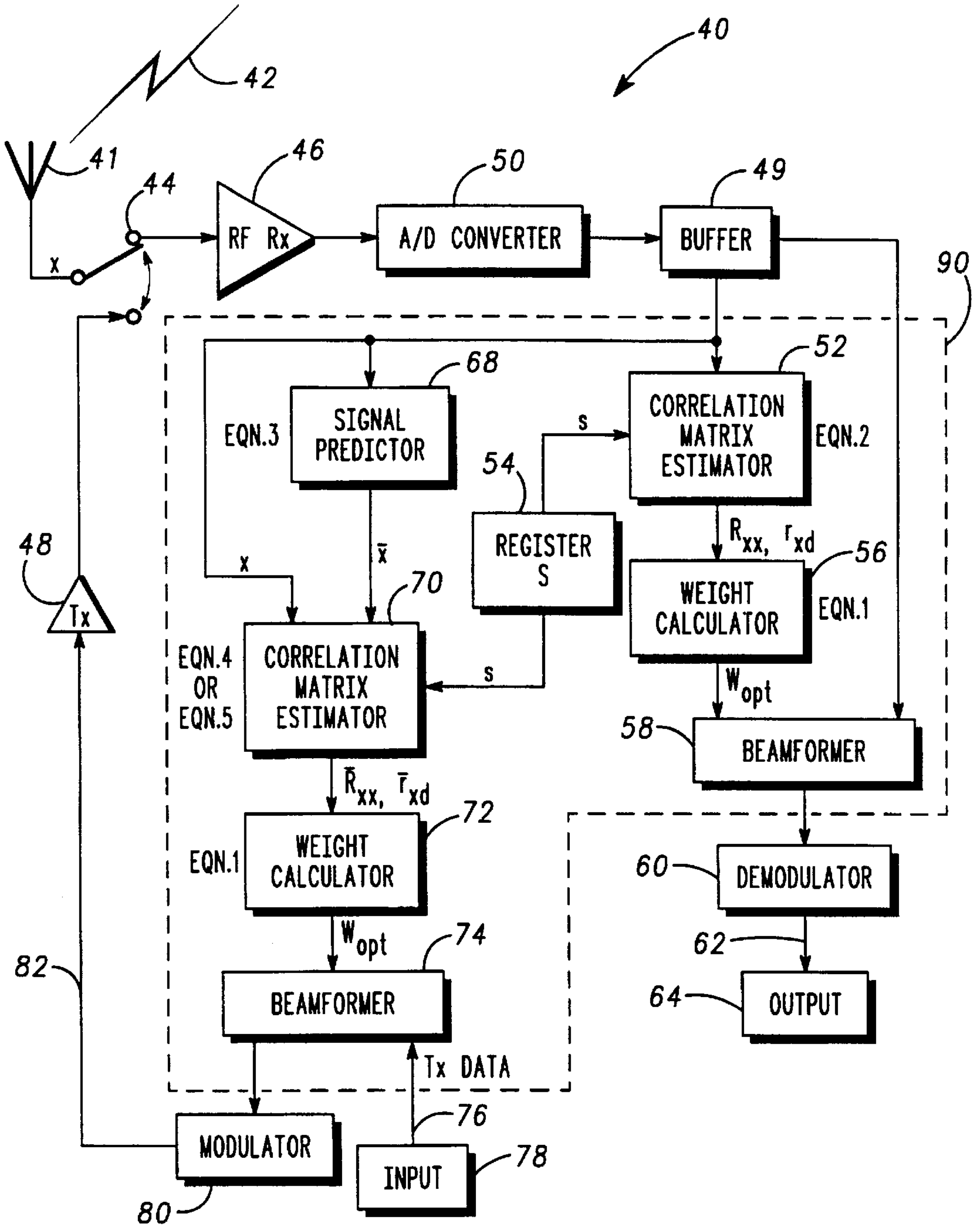
FIG. 3 is a functional diagram illustrating a mechanism and apparatus (in accordance with a preferred embodiment of the present invention) for adaptive beamforming.

Turning now to FIG. 3, a functional diagram of a mechanism and apparatus 40 for adaptive beamforming (in accordance with a preferred embodiment of the present invention) is illustrated. The apparatus 40 is a communication device, such as a base station or a mobile unit (as appropriate), that comprises an array of antenna elements 41 for receiving and transmitting encoded signals 42. The array of antenna elements 41 is coupled to an array of antenna switches 44 arranged to selectively couple an array of receivers 46 or an array of transmitters 48 to the array of antenna elements 41.

In a receive path, information bearing signals (i.e. x) received by the array of antenna elements 41 and processed by the array of receivers 46 are coupled to a buffer 49 through an analog-to-digital converter 50. The buffer 49 is arranged to store at least B bursts. Data x stored in the buffer 49 is input into a correlation matrix estimator 52 that is also responsive to a register 54 containing a stored replica of the training sequence, s. The correlation matrix estimator 52 provides values for $R_{xx}$ and $r_{xd}$ (in accordance with eqn. 2) in response to x and s. A weight calculator 56 receives $R_{xx}$ and $r_{xd}$ to implement eqn. 1 to produce values of $w_{opt}$ (i.e. the beamforming coefficients for the receive path) that are applied to respective samples from buffer 49 in a beamformer 58. An output from the beamformer 58 is coupled to a demodulator 60 that in turn provides a decoded output signal 62 to output device 64, such as a speech decoder or a visual display unit (VDU).

In a transmit path, the data stored in the buffer 49, relating to the previous frames, is input into a signal predictor 68 arranged to calculate $\overline{x}$, according to eqn. 3. The data x stored in the buffer 49 is also input into a correlation matrix estimator 70 (further responsive to $\overline{x}$ and also the replica of the training sequence, s, stored in the register 54) which implements one of eqn. 4 or eqn. 5 to produce $\overline{R}_{xx}$ and $\overline{r}_{xd}$. A second weight calculator 72 (which may be weight calculator 56) receives $\overline{R}_{xx}$ and $\overline{r}_{xd}$ to implement eqn. 1 to produce values of $w_{opt}$ (for the transmit path) that are applied, in a beamformer 74 (which may be beamformer 58), to data 76 from an input device, such as a modem or keyboard. An output from the beamformer 74 is coupled to an array of modulators 80 that in turn provide encoded output signals 82 to the array of transmitters 48 and, ultimately, to the array of antenna elements 41 through the array of antenna switches 44.

As will be appreciated, correlation matrix estimators 52 and 70, weight calculators 56 and 72, beamformers 58 and 74 and signal predictor 68 are typically implemented within a microprocessor 90, while register 54 can be located internally (as shown) or externally to the microprocessor 90.

The information received by the communication device during the burst may be data or encoded voice, for example. Furthermore, in the specific case of data, several frames may be buffered at the beginning of a communication so as to allow accurate transmit beamforming. However, in the instance of voice communication, it may be necessary to commence the communication with an omni-directional pattern of estimated beamforming coefficients and coverage to optimise initial weighting factors, and then to introduce the mechanism of the present invention to the communication at the earliest possible time, i.e. after receipt of at least one burst transmission.

Although the present invention has been described in relation to the GSM pan-European digital cellular communication system, it will be appreciated that the present invention is applicable to any two-way system, including those using time division multiplexed (TDM) protocols, acoustic waves and duplex systems. Furthermore, implementation of the present invention may be at a mobile unit or at a base station responsible for control of many mobile units.

It will, of course, be understood that the present invention has been given by way of example only and that modifications in detail may be made within the scope of the invention, e.g. the predictive filtering technique (that is used in collaboration with actual received data, which predictive filtering technique need not be restricted to linear predictive filtering as specifically described in relation to the exemplary embodiment of the present invention) may be extended to more than one frame in advance of the immediate burst transmission. Therefore, although processing time will be increased, accuracy will be corresponding diminished.

I claim:

1. Apparatus (40) for receiving and transmitting information (42) from an array (41) of adaptive antenna elements, the apparatus comprising storage means (49) for storing received information (x) and characterised by:

a predictive filter (68) for estimating, in response to the received information, predicted information (x) likely to be received by the apparatus in at least one future transmission to the apparatus; and means (70) for combining the previously received information (x) and the predicted information ($\overline{x}$) to generate beamforming coefficients ($w_{opt}$) for weighting information (76) to be transmitted subsequently from the array (41) of adaptive antenna elements, thereby allowing beamforming coefficients to be calculated prior to receipt of information to be received by the apparatus (40) in at least one future transmission to the apparatus.

2. Apparatus according to claim 1, wherein the predictive filter (68) is a linear predictive filter of the form:

$$\overline{x}(n)=\sum_{m=n-M}^{n-1}a_m^T x(m)$$

where:

i) $\overline{x}$(n) is the predicted information ii) $a_m$ are vectors of filter coefficients;

iii) x(m) is the received information;

iv) T is a vector transposition function in which rows are substituted for columns and vice versa;

v) M is a length of the linear predictive filter;

vi) m is an index integer; and iv) n is a current frame.

3. Apparatus according to claim 2, wherein the means (70) for combining includes a correlation matrix estimator for estimating a correlation matrix between the predicted information $(\bar{x})$ and the received information (x), according to the form:

$$\frac{1}{B}\left(\sum_{k=n-B+1}^{n-1} x^*(k)x^T(k) + \bar{x}^*(n)\bar{x}^T(n)\right)$$

where:

i) $x=[x_1, x_2, \ldots x_{(n-1)}, x_{(n-2)}]^T$ is a received signal vector at the array of adaptive antenna elements;

ii) $x^*$ is a complex conjugate of x; and vii) B is a number of sample portions taken into consideration per estimation.

4. Apparatus according to claim 2, wherein the means (70) for combining includes a correlation matrix estimator for estimating a correlation matrix between the predicted information $(\bar{x})$ and the received information (x), according to the form:

$$\frac{1}{B}\left(\sum_{k=n-B+1}^{n-1} c(k-n+B)x^*(k)x^T(k) + c(B)\bar{x}^*(n)\bar{x}^T(n)\right)$$

where:

$x=[x_1, x_2, \ldots x_{(n-1)}, x_{(n-2)}]^T$ is a received signal vector at the array of adaptive antenna elements;

ii) $x^*$ is a complex conjugate of x;

iii) B is a number of sample portions taken into consideration per estimation; and iv) c is a set of constants [c(1) . . . c(B)] appropriate to an anticipated rate-of-change of the correlation matrix.

5. Apparatus according to claim 1, wherein the receiving and transmitting of information is in bursts.

6. Apparatus according to claim 5, wherein the bursts are in a time division multiplexed (TDM) communication system.

7. Apparatus according to claim 5, wherein the received information is obtained from a predetermined number of bursts.

8. Apparatus according to claim 1, wherein the apparatus is a base station.

9. Apparatus according to claim 1, wherein the apparatus is a mobile unit.

10. A method of receiving and transmitting information in an apparatus(40) having an array (41) of adaptive antenna elements, comprising the step of storing (49) received information (x) and characterised by the steps of:

estimating (68), in response to the received information (x), predicted information $(\bar{x})$ likely to be received by the apparatus (40) in at least one future transmission to the apparatus; and combining (70) the previously received information and the predicted information to generate beamforming coefficients for weighting information to be transmitted subsequently from the array of adaptive antenna elements, thereby allowing beamforming coefficients to be calculated prior to receipt of information to be received by the apparatus in at least one future transmission to the apparatus.

* * * * *